US007788330B2

(12) United States Patent
Goggin

(10) Patent No.: US 7,788,330 B2
(45) Date of Patent: Aug. 31, 2010

(54) SYSTEM AND METHOD FOR PROCESSING DATA ASSOCIATED WITH A TRANSMISSION IN A DATA COMMUNICATION SYSTEM

(75) Inventor: Seán A. Goggin, Waterloo (CA)

(73) Assignee: Research in Motion Limited, Waterloo (CA)

( * ) Notice: Subject to any disclaimer, the term of this patent is extended or adjusted under 35 U.S.C. 154(b) by 637 days.

(21) Appl. No.: 11/466,821

(22) Filed: Aug. 24, 2006

(65) Prior Publication Data
US 2008/0052341 A1 Feb. 28, 2008

(51) Int. Cl.
*G06F 15/16* (2006.01)
(52) U.S. Cl. .................. 709/206; 709/224; 709/201; 709/208; 370/235
(58) Field of Classification Search ............. 709/201, 709/206, 208, 224; 370/235
See application file for complete search history.

(56) References Cited

U.S. PATENT DOCUMENTS

| 5,890,154 | A * | 3/1999 | Hsiao et al. ............... 707/8 |
| 6,219,694 | B1 * | 4/2001 | Lazaridis et al. ........... 709/206 |
| 6,381,712 | B1 * | 4/2002 | Nemitz ..................... 714/57 |
| 7,120,685 | B2 * | 10/2006 | Ullmann et al. ............ 709/224 |
| 2003/0028632 | A1 | 2/2003 | Davis |
| 2004/0059789 | A1 * | 3/2004 | Shum ....................... 709/206 |
| 2004/0133626 | A1 * | 7/2004 | Herrero et al. ............. 709/200 |
| 2006/0040711 | A1 | 2/2006 | Whistler |
| 2006/0153068 | A1 * | 7/2006 | Dally et al. ................ 370/219 |
| 2008/0008095 | A1 * | 1/2008 | Gilfix ....................... 370/235 |

FOREIGN PATENT DOCUMENTS

WO WO 2005/093607 10/2005

OTHER PUBLICATIONS

Lonvick, C., "The BSD syslog Protocol", Aug. 2001, Network working Group, Cisco Systems.
Tanenbaum, A. S., "Distributed Systems: Principles and Paradigms", 2002, Prentice Hall, Amsterdam, Netherlands.

* cited by examiner

*Primary Examiner*—Tonia L M Dollinger
*Assistant Examiner*—Kyung H Shin
(74) *Attorney, Agent, or Firm*—Brett J. Slaney; Blake, Cassels & Graydon LLP

(57) ABSTRACT

A method and system are provided for processing large amounts of data associated with messages and other transmissions that are routed through a data communications system. A distributed system is used to process the data in parallel. The system includes a master processor and at least one additional processor. The master processor is responsible for obtaining the data and routine the data to the additional processors. The additional processors filter the data for information pertaining to the data and the filter results are combined. An on-demand filter can be run in parallel from a web server which allows dynamic filtering of information that is of interest at a particular time.

19 Claims, 16 Drawing Sheets

SYSTEM AND METHOD FOR PROCESSING DATA ASSOCIATED WITH A TRANSMISSION IN A DATA COMMUNICATION SYSTEM

TECHNICAL FIELD

The following relates to systems and methods for processing data associated with a transmission in a data communication system.

DESCRIPTION OF THE PRIOR ART

In many data communications systems, vast amounts of data pass through various nodes in the system, for example nodes such as corresponding entities, servers, relays, etc. In some cases, the data is structured in the form of a message sent between two entities and each message has certain operational data associated with it. The data may contain useful information that can be used to determine the nature of the messages. Often, system administrators wish to ascertain the nature of the messages in order to, e.g., investigate or repair problems or to provide a better service.

In order to ascertain the nature of the messages, a system is placed at some point in the path of the message whereby it obtains the operational data associated with the message and logs, evaluates and stores this data. Such systems are generally referred to as log scanning or tog processing systems. Ultimately, the goal of a log processing system is to automatically filter and record events sequentially, and often chronologically.

As the number messages processed by the log processing system increases, so to does the processing requirements for the system. In communications systems, typically the number of messages to be processed is too many for a log processing system to handle with any efficiency or accuracy and without causing a bottleneck.

It is therefore an object of the following to obviate or mitigate at least one of the above disadvantages.

BRIEF DESCRIPTION OF THE DRAWINGS

Embodiments will now be described by way of example only with reference to the appended drawings wherein.

DETAILED DESCRIPTION OF THE DRAWINGS

Figure 1:
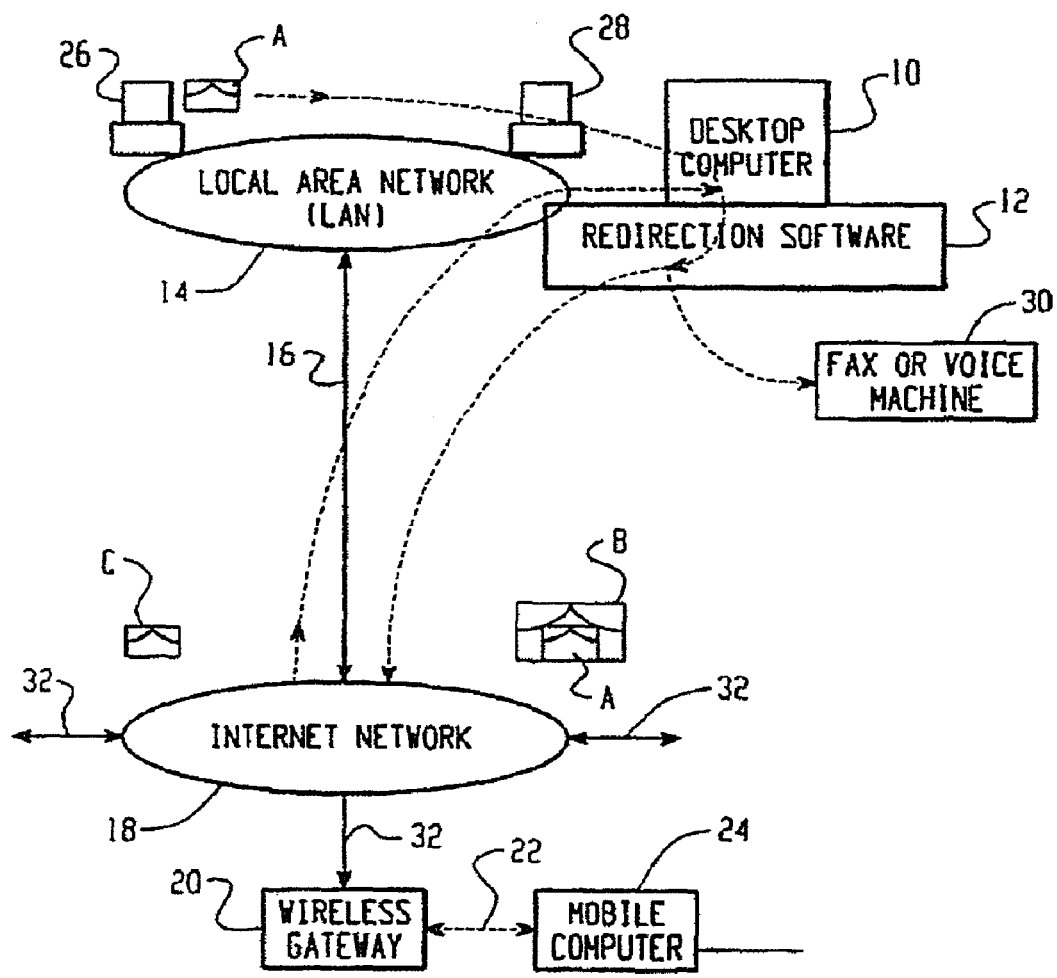
FIG. 1 is a system diagram showing the redirection of user data items from a user's desktop PC (host system) to the user's mobile data communication device, where the redirector software is operating at the user's desktop PC.

Referring now to the drawings, FIG. 1 is an exemplary system diagram showing the redirection of user data items (such as message A or C) from a user's office PC (host system) 10 to the users mobile data communication device 24, where the redirector software 12 is operating at the user's PC. Message A in FIG. 1 represents an internal message sent from desktop 26 to the user's host system 10 via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video) or a machine capable of processing and playing audio files, such as a voice mail system. The system shown includes the ability to redirect certain message attachments to such an external machine 30 if the redirector program configuration data reflects that the mobile device 24 cannot receive and process the attachments, or if the user has specified that certain attachments are not to be forwarded to mobile device 24, even if such device can process those attachments.

By way of example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the internet and to send the audio clip to the user's voice mail system. This example is not intended to limit the breadth and scope of the present teachings, but rather to illustrate the variety of possibilities embodied in the redirection concept.

Figure 4:
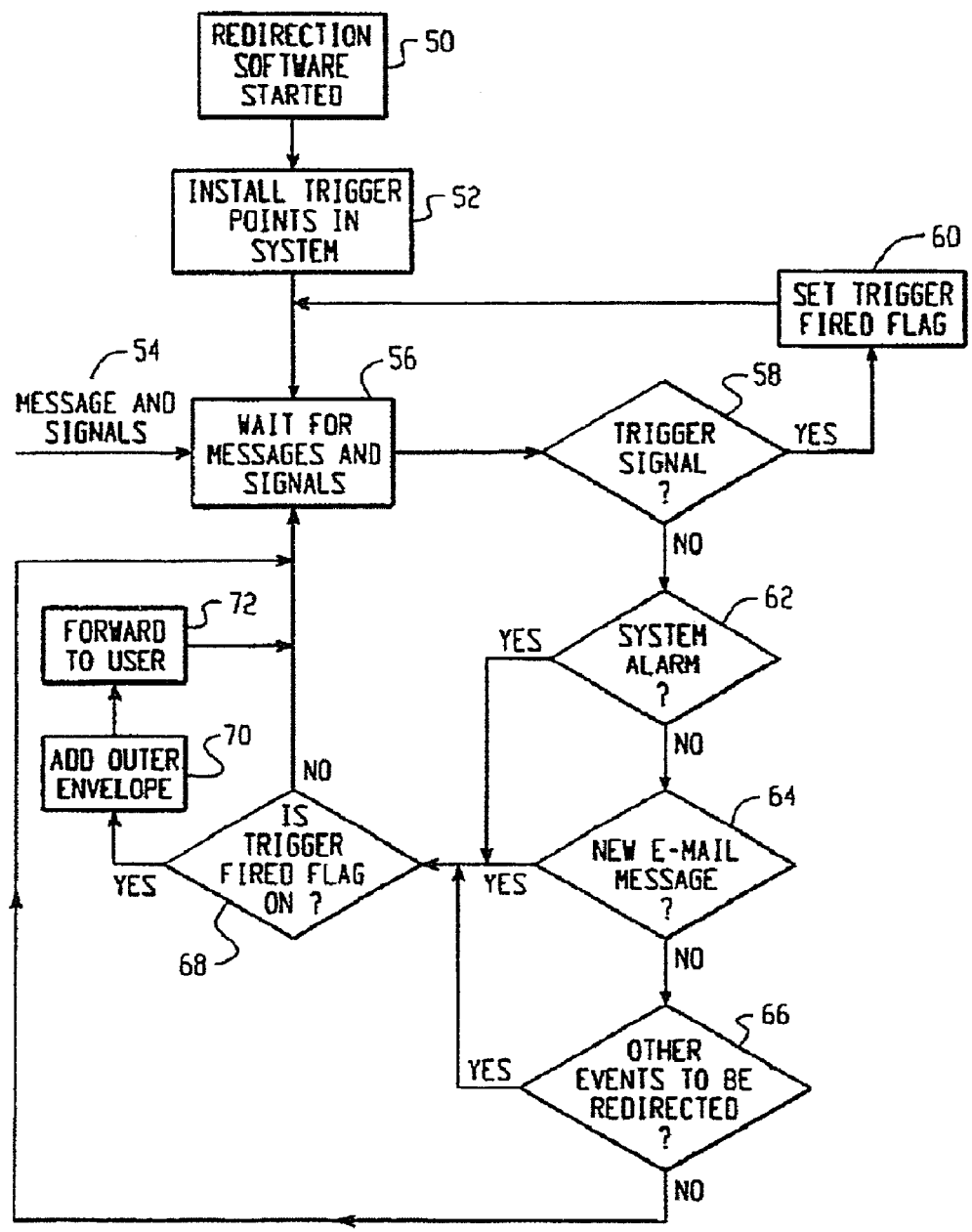
FIG. 4 is a flow chart showing the steps carried out by the redirector software operating at the host system.

The preferred mobile data communication device 24 is a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the system shown could be beneficially used in a "one and one-half" or acknowledgment paging environment, or even with a one-way paging system. The mobile data communication device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

In an alternative embodiment, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1-4.

A user can configure the redirector program 12 to push certain user-selected data items to the user's mobile data communication device 24 when the redirector 12 detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

Among the user-defined event triggers that can be detected by the redirector program 12 are, in the preferred embodiment, external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer, and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. The preferred method of detecting new messages is using Microsoft's® Messaging API (MAPI), in which programs, such as the redirector program 12, register for notifications or 'advise syncs' when changes to a mailbox take place. Other methods of detecting new messages could also be used.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message for redirection, the redirector program 12 could compress the original message A, could compress the message header, or could encrypt the entire message A to create a secure link to the mobile device 24.

Also programmed into the redirector 12 is the address of the user's mobile data communication device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30.

The redirector may also be programmed with a preferred list mode that is configured by the user either at the host system 10, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can then send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the software 12 then sends the message A to a secondary memory store located in the mobile device 24, using whatever means are necessary. In the preferred embodiment this method is to send the message A back over the LAN 14, WAN 18, and through the wireless gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the mobile computer 24 appears to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment this results in the outgoing redirected message from the user's host system 10 being sent using the E-mail address of the host mailbox, rather than the address of the mobile device, so that it appears to the recipient of the message that the message originated from the users desktop system 10 rather than the mobile data communication device. Any replies to the redirected message will then be sent to the desktop system 10, which if it is still in redirector mode, will repackage the reply and resend it to the user's mobile data device, as described above.

Figure 2:
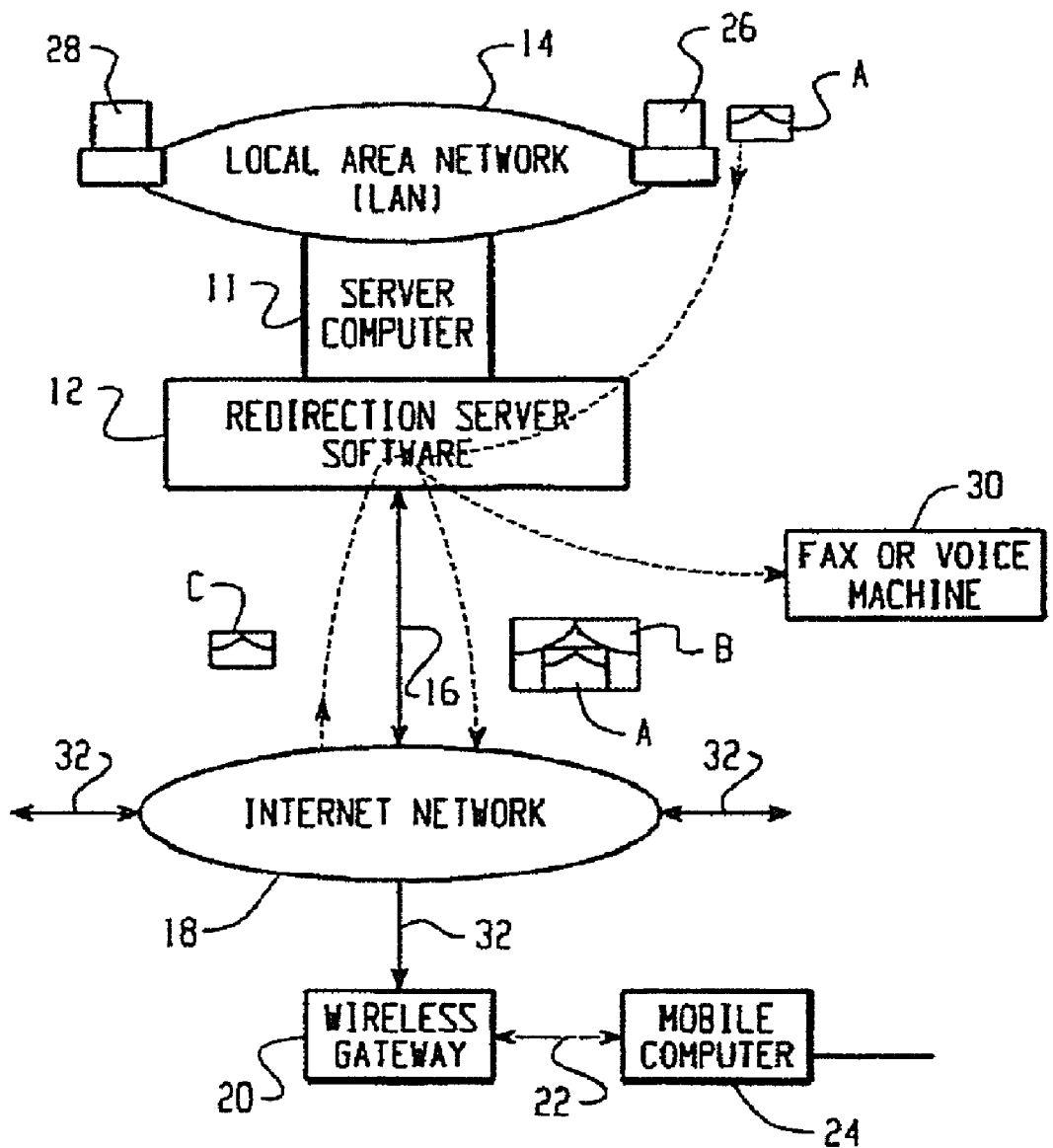
FIG. 2 is a system diagram showing the redirection of user data items from a network server (host system) to the user's mobile data communication device, where the redirector software is operating at the server.

FIG. 2 is an alternative system diagram showing the redirection of user data items from a network server 11 to the user's mobile data communication device 24, where the redirector software 12 is operating at the server 11. This configuration is particularly advantageous for use with message servers such as Microsoft's® Exchange Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 10, 26, 28, including information such as whether a particular user can have data items redirected, which types of message and information to redirect, what events will trigger redirection, the address of the users' mobile data communication device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile data communication device 24, or it could be a message from an external computer, such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
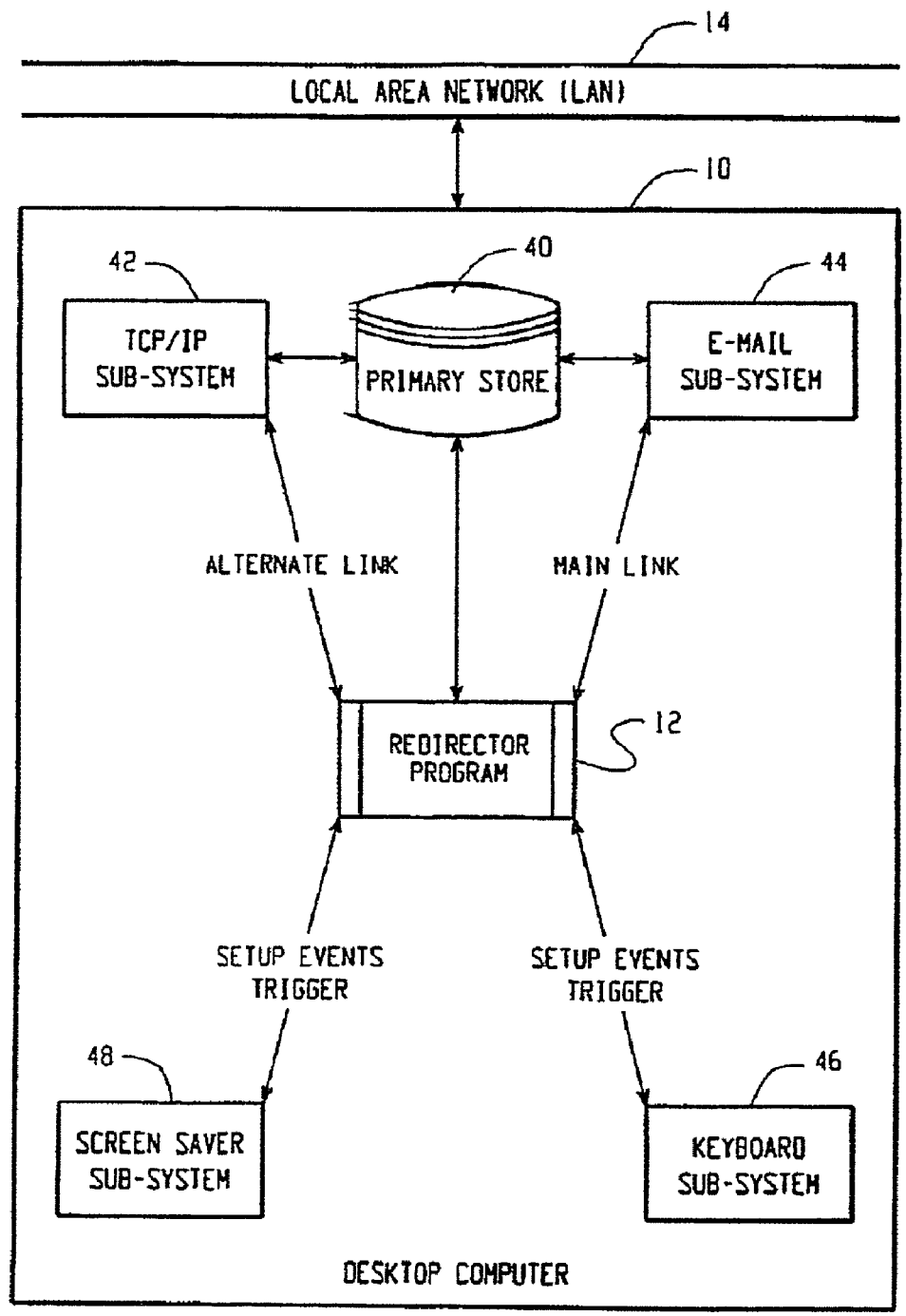
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12 with additional components of the host system 10 of FIG. 1 (the desktop PC) to enable more fully the pushing of information from the host system 10 to the user's mobile data communication device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve transparency, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile data communication device; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10.

In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and realtime delivery.

As described previously, the system can be triggered to begin redirection upon detecting numerous external, internal and networked events, or trigger points. Examples of external events include: receiving a command message from the user's mobile data communication device 24 to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start the redirection process. For example, the screen saver system can be configured so that when the screen saver is activated, after, for example, ten (10) minutes of inactivity on the desktop system, an event trigger is transmitted to the redirector 12, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10 that can be used to generate internal event triggers.

Figure 5:
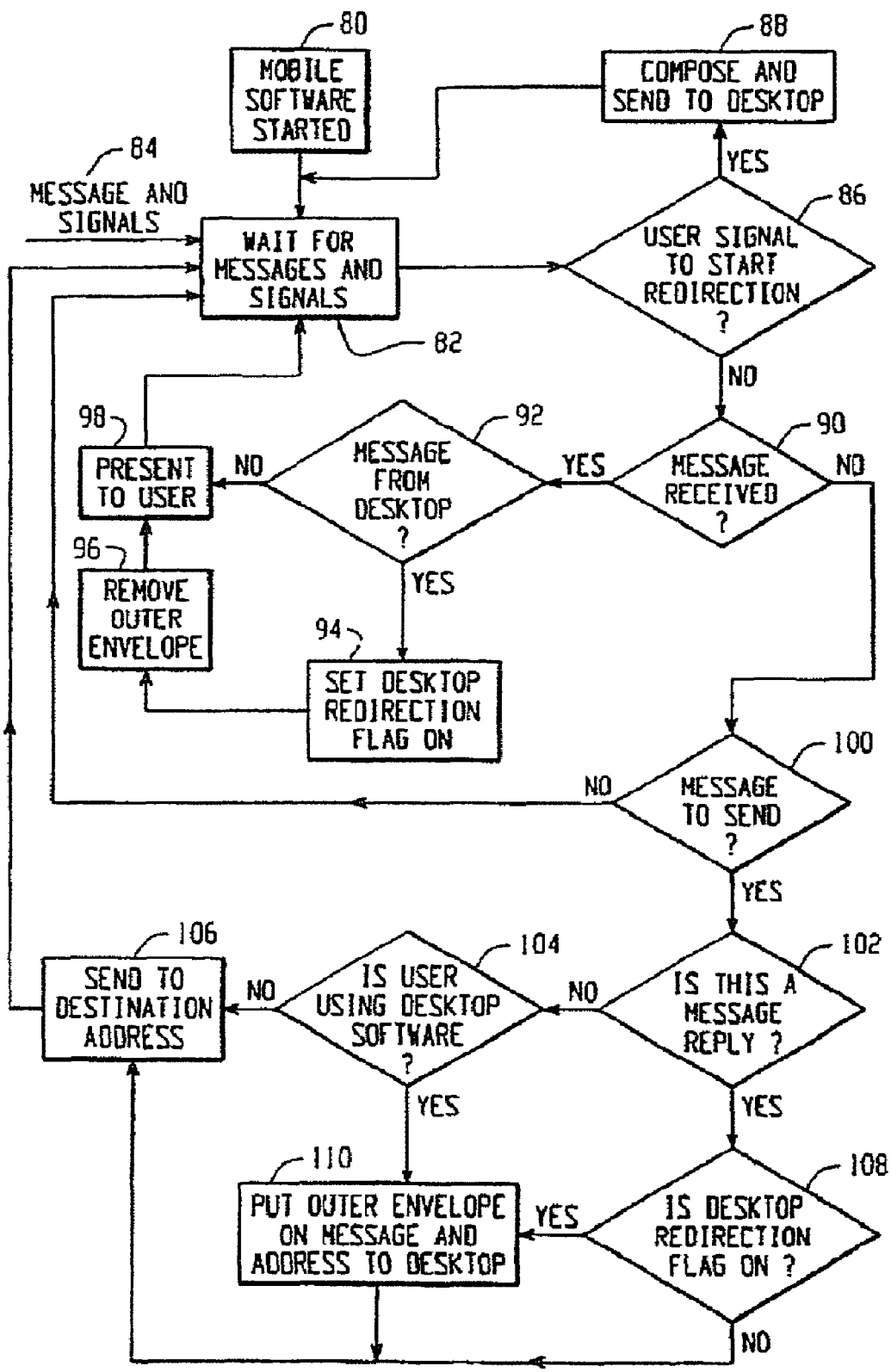
FIG. 5 is a flow chart showing the steps carried out by the mobile data communication device to interface with the redirector software operating at the host system.

FIGS. 4 and 5, set forth, respectively, flow charts showing the steps carried out by the redirector software 12 operating at the host system 10, and the steps carried out by the mobile data communication device 24 in order to interface with the host system. Turning first to FIG. 4, at step 50, the redirector program 12 is started and initially configured The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing and the address of the mobile device.

Once the redirector program is configured 50, the trigger points (or event triggers) are enabled at step 52. The program 12 then waits 56 for messages and signals 54 to begin the redirection process. A message could be an E-Mail message or some other user data item that may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag is set, then at step 70, the redirector 12 causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender is on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12. At step 80 the mobile software is started and the mobile device 24 is configured to operate with the system, including, for example, storing the address of the user's desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86, the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine 10. In this situation where the mobile device 24 is sending a message directly to the desktop system 10, no outer wrapper is added to the message (such as message C in FIGS. 1 and 2). In addition to the redirection signal, the mobile device 24 could transmit any number of other commands to control the operation of the host system, and in particular the redirector program 12. For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is repackaged with the outer envelope having the addressing information of the user's desktop system 10, and the repackaged message is then transmitted to the desktop system 10 at step 106. As described above, the redirector program 12 executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If however, the mobile determines that the user is using the redirector software 12 at the desktop system 10, then control passes to step 110, where the outer envelope is added to the message. The repackaged original message is then transmitted to the desktop system 10 at step 106, which, as described previously, strips the outer envelope and routes the message to the correct destination. Following transmission of the message at step 106, control of the mobile returns to step 82 and waits for additional messages or signals.

Figure 6:
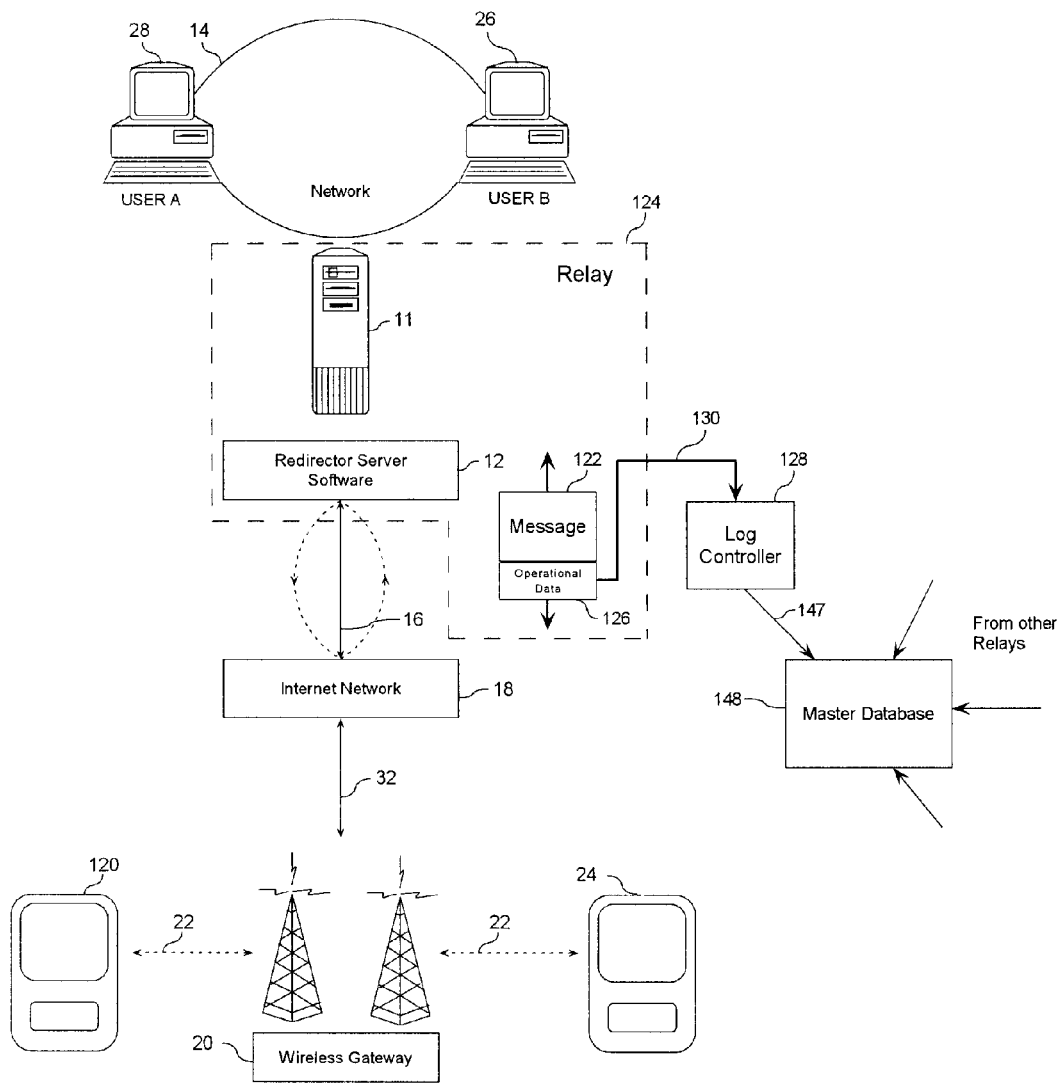
FIG. 6 is a block diagram showing an embodiment of a system for log processing.

Referring now to FIG. 6, systems such as that described above with respect to FIGS. 1-5 often include a relay 124 having the redirector server software 12, and a server 11 hosting the software 12. The relay 124 provides the infrastructure responsible for communicating transmissions such as email messages over a data communication system. For example, in network 14, User B at desktop 26 sends a message to User A at desktop computer 28 and a copy of the email message is pushed to a mobile communication device 120 associated with User A. The relay 124 handles the redirection of messages 122 sent between network 14 and internet network 18. Each message 122 includes operational data 126, associated therewith. In this example, the message 122 is an email communication that comprises unstructured operational data 126 that is associated with the message 122. The operational data 126 can include any data that is relevant to the message such as a sender identifier, a destination identifier, time/date information, location, system information etc. Typically, since the data 126 is unstructured it needs to be reconstructed in order to provide useful information.

In the example shown in FIG. 6, User A and User B at desktop computer 26 are connected to a network 14 which connects to server 11 at the relay 124. A log controller 128 that is capable of accessing the source 125 as is passes through the relay 124 obtains the operational data 126 over connection 130. Preferably, the operational data 126 is obtained according to the RFC3164 message reporting protocol, hereinafter referred to as "Syslog".

After processing the data 126, the log controller forwards a result (not shown) to a master database 148 over connection 147. The connection 147 can be any communications link such as an Ethernet when the log controller 128 and master database 148 are present on the same network (not shown). The master database 148, where applicable, also receives merged result lists from other relays (not shown).

Figure 7:
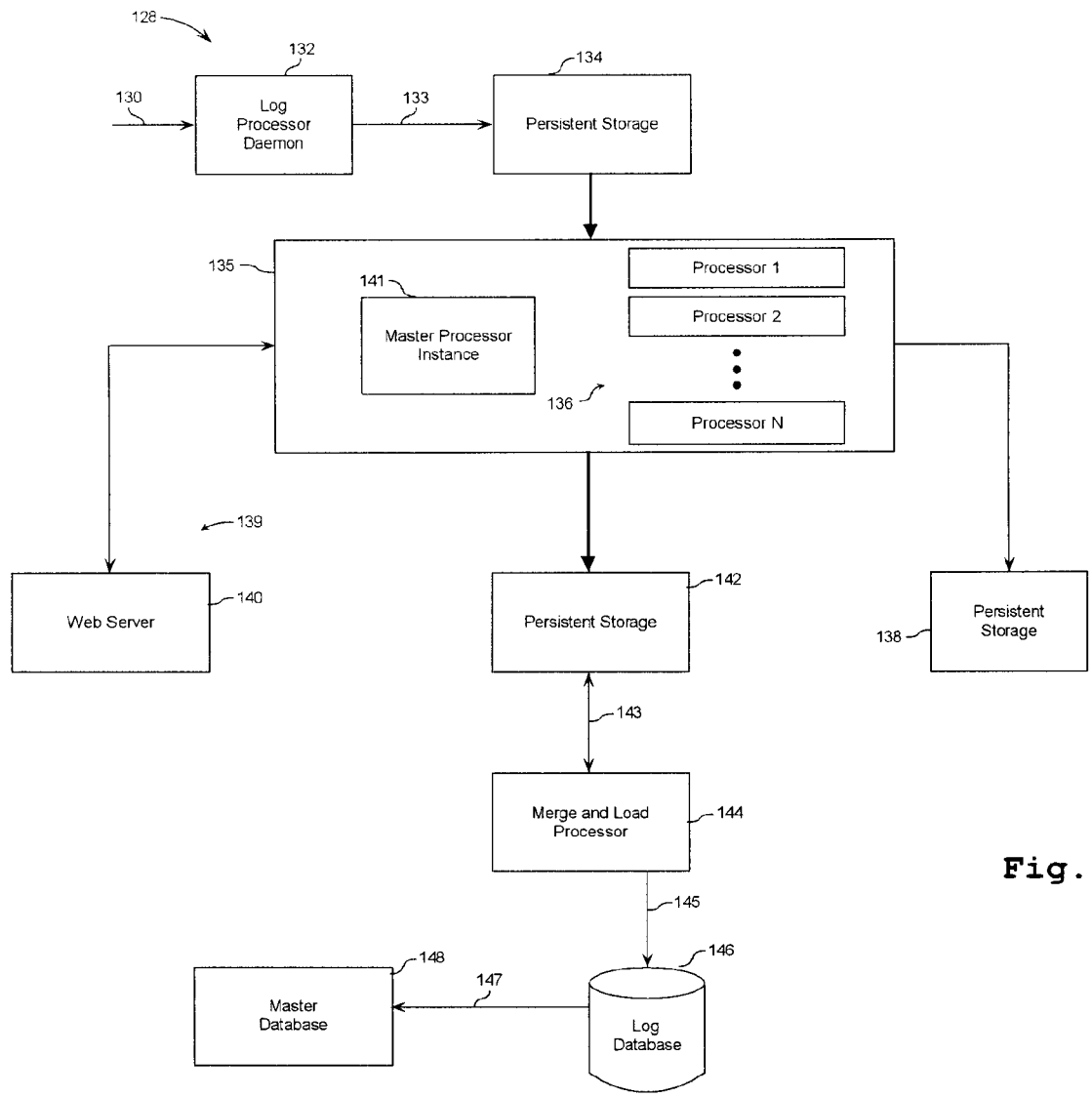
FIG. 7 is a block diagram showing components of the log controller of FIG. 6.

The log controller 128 is shown in greater detail in FIG. 7. The operational data 126, once it becomes an input to the log, controller 128 via connection 130, is divided into "chunks" of data each of which are hereinafter referred to as a "source". Source is a generic term that may include objects such as sockets, streams, or SAP transactions.

The log controller 128 comprises a log processor daemon 132 (e.g. Syslog daemon) running in the background on a log processor machine for obtaining the sources from the relay 124. Input sources are directed to persistent storage 134 over connection 133 that temporarily stores the sources until they are assigned to a particular processor. The persistent storage 134 is any type of data storage that is accessible by the log, processor machines. There may be a single storage 134 (shared) or the storage 134 may include several locations.

Processors receive source files into an incoming directory on the persistent storage 134. Typically, sources are in text formats (e.g. syslog, BLP, CSV) and binary native database formats (e.g. Oracle export DMP files). The text data files are typically line-oriented and encoded, e.g., in the ISO-8859-1 character set or "Latin-1" set. Sources arrive on input 130 asynchronously and the source processing order is preferably based on an estimate of a time associated with data in the source. In one embodiment, source files arrive with a filename that contains a time that is used for time estimates.

Filter lists are maintained by each source, where only filters that match the source file type, content pattern and time range are added to the source's filter list. A filter is an object that accepts raw data as input and outputs a structured record. Two filter object implementations that are described in greater detail below are LogMiner filters and LogExpress filters. In this example, a filter is interested in data if the source type matches a specified pattern (e.g. filename), the time frame of the data is within a specific range and the data record content matches a content pattern. As such, the filters have content and filename patterns and register their content patterns with a common pre-filter object that calls back the specific filters upon a match. The null pattern is a special pattern that matches everything (both based on content and source patterns). For example, a filter for finding an OS version of a device may only be interested in registration server sources and not WT or SRP handler sources. The filename pattern is used to restrict the Syslog sources scanned to only registration server output files.

Also, LogExpress filters, which are on-demand, are typically only interested in sources from a particular timeframe and may choose to ignore files older than the filter "start time". Once a candidate source is found by the filter object, an examination of the content begins. Typically, most lines within the source are discarded and only lines containing a specific content pattern (e.g. Event=Registration) are extracted to avoid useless filtering operations. The filters on a source register with a FilterGroup object which creates a unified pattern to optimize scanning for data. The log controller 128 should allow for filter recursion where a running filter creates a new filter request. For example, a LogExpress PIN filter that then creates a message ID filter. The use of recursive filters should be managed as there is a risk of exponential growth in the processor workloads. Filter recursion is described in greater detail below making reference to FIG. 10.

In systems such as email systems that handle a vast number of messages 122, the task of processing the operational data 126 can become insurmountable for conventional log processing systems that operate using a single processor operating serially. In order to avoid the inevitable backlog that occurs at a single processor as the amount of data passing through the relay 124 increases, a cluster of server machines or "distributed system" 135 is used. The distributed system 135 comprises multiple processors 136 under the control of a designated master processor 141 connected in parallel to the input persistent storage 134, an output persistent storage 142 for temporarily storing filter result lists for each source subsequent to processing, an archive persistent storage 138 for archiving data, and a web server 140 hosting programs for executing on-demand filter queries (e.g. LogExpress filter objects) for the sources that are obtained using the log processor daemon (e.g. Sysioa) and for executing bulk filtering as will be described below.

In the example shown in FIG. 7, an arbitrary N number of processors 136 are shown and it will be appreciated that N is dependent on the actual distributed system 135 and its specific requirements. Distributed systems are well known in the art and a complete discussion can be found in, e.g., "Distributed Systems: Principles and Paradigms"; Tanenbaum Andrew S.; Prentice Hall; Amsterdam, Netherlands; 2002. Each "processor" (141 and 136) represents a server instance in the distributed system 135 and are instances of server software. Typically, each server machine in the cluster runs a single server instance. The master server instance 141 runs on a designated server machine in the cluster that can change over time. The master server 141 is responsible for distributing workload amongst the other processors 136 to process a particular quantity of data in parallel, i.e. in a single pass. It will be appreciated that the master server instance 141 is preferably not predefined but rather automatically created from a set of available processors and assigned based on this availability.

The filter result lists for each source are temporarily placed into a result list object and held in the persistent storage 142. The persistent storage 142 may be any data storage device at any location that is capable of temporarily storing data that is too large to fit in memory. The result list objects for the sources are merged to create a bulk global results list and loaded into a log database 146 via connection 145 by a processor 144 assigned by the system. Preferably, a top level summary, e.g. total throughput, is sent to a master database 148 over connection 147 for persistent storage, in this example using, SQL.

It is therefore seen in FIG. 7 that by processing data in parallel using the distributed system 135, a greater amount of data can be handled in a single pass.

Figure 8:
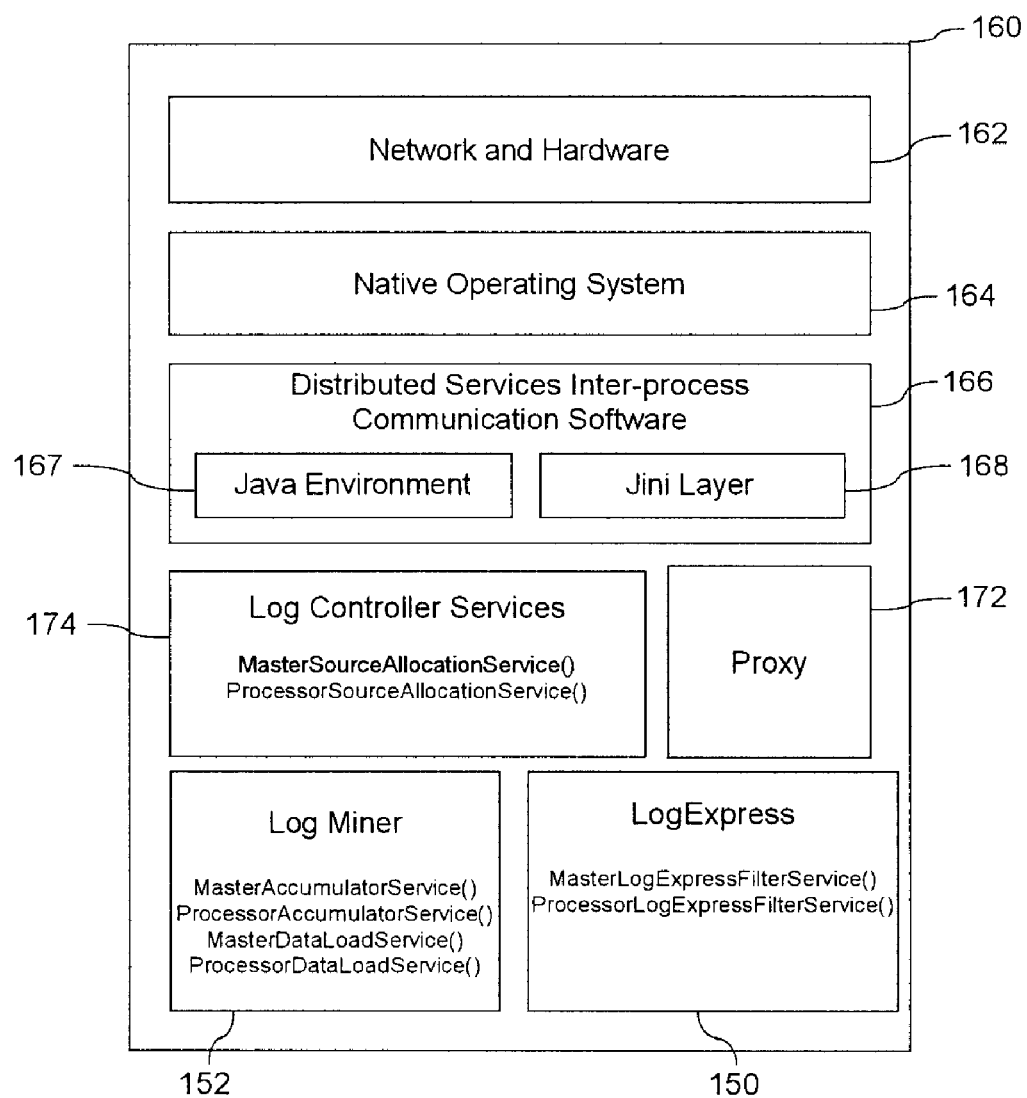
FIG. 8 is a block diagram of a log processor machine.

A log processor machine 160 (server machine in the cluster) is shown in greater detail in FIG. 8. The log processor machine 160 comprises several layers, including a network and hardware layer 162 for performing network routing and handling end to end communications and address translation; and a native operating system 162 for managing the hardware and software resources of the machine 160. The machine 160 also includes distributed services inter-process communication software 166 which provides inter-process communications that are specific to the operating environment being utilized. For example, a Java environment 167 may be used as an operating environment that is developed in the Java object-oriented programming language. Another layer 168, in such an example can provide Jini based services, which extend Java based interfaces to the network in order to provide inter-process communications.

Jini technology is well known in the art as a network architecture for the construction of distributed systems. Jini technology provides a flexible infrastructure for delivering services in a network and for creating spontaneous interactions between clients that use these services regardless of their hardware or software implementations. Jini is an open architecture that enables the creation of network-centric services (whether implemented in hardware or software) that are highly adaptive to change. Jini technology is typically used to build adaptive networks that are scalable, evolvable and flexible as typically required in dynamic computing environments. The Jini layer 168 is responsible for the communications across the distributed system 135 whereby each processor instance (136, 141) executes on a similar machine 160. The Jini layer 168 elects and accesses services across the cluster with remote procedure calls. The Jini layer 168 provides a mechanism to find services and also detect the loss of services. In this example, Jini uses a well-known port 4160 for multicast and, additionally, the configuration system can be used to give additional unicast and multicast addresses for Jini to use. For example, Jini can use reserved multicast addresses 224.0.1.84 (to announce services) and 224.0.1.85 (to request services), both on port 4160. When a service is discovered, unicast TCP messages are sent to the services. The unicast messages are remote procedure calls normally in RMI format. Although this example includes the use of Jini, it will be appreciated that other election protocols for distributed systems such as JXTA could also be used.

The log controller services 174 provide the basic services of the log controller 128 such as scheduling, load balancing amongst the processors 136 and running registered filters.

There are two log controller services that can use for example Jini, namely, a master source allocation service, which allocates sources to cluster members (i.e. processors 136); and a companion processor source service on each machine 160 in the cluster, which feeds source data into the appropriate filters.

The master source allocation service is the single authoritative controller of the sources and detects new sources, assigns each source to a processor source service (on a particular processor 136), and archives the source when processing is complete. The master source allocation service is elected within the cluster of processors 136. The master source allocation service finds sources that exist in the input location 130 and allocates them to available processors 136. If a processor 136 leaves the cluster 135 due to failure or shutdown, the master source allocation service re-allocates the source to a new processor 136. The master source allocation service contacts each processor source service to confirm the allocation and, since it controls the source allocations, it can control the order and number of sources allocated to each processor 136. The master source allocation service also maintains the state of each source. A source can exist in many different states such as "unassigned", where a new file is discovered but not yet assigned; "assigned", where the source has been allocated to a processor 136; "read complete", where all data in the source has been read/filtered; and "committed", where all result lists from the source have been saved to the master storage 148. The master source allocation service commands the processor source service to remove a source if it wishes to de-allocate the source on that particular processor 136. For example, de-allocation may occur in order to rebalance the load on the distributed system 135 or if the source is removed from the input location 130.

The processor source service is responsible for retrieving a list of active filters, reads data from the source and passes sources to any filter that has expressed an interest for the source type and/or content pattern. The source notifies the processor source service when processing is "read complete" and the processor source service in turn notifies the master source allocation service so that the master source allocation service can update its state information. Each processor source service registers as a service on startup using, e.g. Jini, which allows it to be accessed by the master source allocation service. The processor source service maintains a set of sources that are assigned to its processor 136 and is called by the master source allocation service to add and remove sources. Typically, there is no need for reconstruction upon failure since the service starts with an empty internal list of sources and, existing sources assigned to the service should timeout and be reassigned as will be explained in greater detail below.

The Log Miner service 152 is a program that performs static bulk data processing of the data in the sources and bulk loads the filtered information of interest into a database. The LogMiner system runs bulk filters that generate a result list for each source and each bulk filter type.

To distinguish between the system as a whole and the service that provides the bulk filtering functionality, the following convention is used. LogMiner as a single word refers to the system as a whole whereas Log Miner separated into two words refers to the service.

LogMiner includes several objects used by the Log Miner services. An Mfilter object derived from a LogController filter object is used as a parent object for the different types of filters provided by the LogMiner system. A filter object uses the information parsed from the current input line to generate a result object, which is inserted into a result list object. A filter object also assists in the construction of merged result lists from the intermediate files. Intermediate files are temporary data files saved in persistent storage 142 since result lists can become too large to remain in memory. LogMiner can save the result list to disk as an intermediate file and reload them during a merge operation at a later time.

An instance of an MfilterListFactory object is passed to the LogController 174 in order for it to generate lists of filters that can act on a given source. The factory iterates over the list of known filter types and checks its status (active or inactive) and whether or not the filter is interested in the given source.

A result object is used to store the filter specific information. Result objects may be used to merge duplicate results in a manner determined by the specific type of result object. Result objects provide the capability of writing to and reading from the intermediate files. An example of a relatively complex result object is a message to handheld/message from handheld (MTF/MFH) merger, which merges start and end records.

Result lists store and manage result objects for a specific filter type. The result lists are also responsible for creating and managing intermediate storage files as they become necessary and commit all of their results to the intermediate storage making it available to other services upon completion of the input. A result list may also provide a facility to flush its current contents to disk, periodically, in order to reclaim memory.

A master Log Miner service 152 performs any necessary initialization and allows the system to be reconstituted in case of failure. The primary function of the master Log, Miner service is to allocate resources necessary for the processor Log Miner services to run. The processor Log Miner services 152 provide a factory to the LogController service 174 which can then be used to create bulk filters as needed. The bulk filters generate a result list for each source for each bulk filter type. Result objects are used to insert the data into the result list. When the LogController 174 has finished reading a source, it signals the bulk filters to commit their results. The filters in turn pass a commit message on to the result list which will iterate over their result objects and ask them to format and write their data to a disk file.

The Log Miner service 152 comprises various services that use, e.g. Jini, namely a master data accumulator service, processor data accumulator service, master data load service and a processor data load service.

A single master accumulator service is elected within the cluster of processors 135, which assigns an accumulation operation to a processor accumulator service running on each processor in the cluster 135 for scheduling work. On failure, the master accumulation service consults all processor accumulation services and the database to find the next needed accumulation operation.

An instance of the processor accumulator service runs on each processor and is assigned an accumulation operation by the master accumulator service. The accumulation operation is responsible for merging all the result lists of the same filter type from each "read complete" source, generated by any processor 136. The accumulated result list is written to an external file, e.g. Oracle external file, for the master data load service. If a processor accumulator service fails, the master accumulator service will no longer include it in its scheduling. If no confirmation is received by the lease expiry of "in progress" accumulations from a processor accumulator service, the accumulation operation will be rescheduled to an available service.

A single master load service is elected within the cluster of processor, which assigns load operations to processor load services running on each processor in the cluster, to perform load operations for a filter type. On failure, a new master load service is elected and the state is reconstructed by consulting the database and all processor data load services.

An instance of the processor data load service runs on each processor in the cluster and will load the data into the database 146 as initiated by the master data load service. The data is typically in a native database format or converted to a native database format by the processor accumulator service. The processor load service has additional controls to ensure that a set of sources is loaded as a group. An example of a set of sources required to be loaded together in a group is a set of provisioning sources that need to be loaded as a group to ensure consistency in the database 146. The processor load service may run any required SQL code for the load operation, e.g. SQL code that includes truncating named tables before loads. The processor load service may also call external import applications if needed, e.g. the Oracle import utility "imp". If a processor load service fails, the master load service no longer includes it in its scheduling. If no confirmation is received by the lease expiry of "in progress" load from a processor load service, the load operation is rescheduled on an available service.

The LogExpress 150 is a program that performs on-demand filter queries of the results list objects for certain relay information. LogExpress results are flushed to a database table on, e.g. the web server 140 for displaying the results. The results of LogExpress filters are recorded in a LogExpress schema in a result table in the master database 148. An example result table description is provided below in Table 1.

TABLE 1

Sample result table description

| Field Name | Key? | Type | Description |
|---|---|---|---|
| SOURCE_DTE | | DATE | Date observed or processed. |
| TRACE_DTE | | DATE | Date on source data. |
| RELAY_ID | | NUMBER | Relay ID number. 1 North America, 2 UK, and 3 Asia. |
| REQUEST_GROUP_ID | | NUMBER | This is used for recursive filters. Request number, which is a 64 bit, signed random number which should be unique, but it is not guaranteed. This is commonly the same value as REQUEST_ID. When there is a filter recursion, this ID remains the same and the child requests get new request IDs. |
| REQUEST_ID | | NUMBER | Request number, which is a 64 bit, signed random number which should be unique, but it is not guaranteed. This is new for each request. |
| CNTRL | | VARCHAR2(8) | Control messages, "start" of filter, "end" of filter and "data" record type" |
| SOURCE | | VARCHAR2(64) | Name of Source data found in. |
| PROCESSOR | | VARCHAR2(64) | Name of the source processor of the unique processor ID. |
| DATA | | VARCHAR2(64) | Results if the control type is "data", if "start" is filter arguments, and the "end" status is "normal", "overflow" and "memory". Filters can end normally, can produce too many results ("overflow"), can be stopped, or can fill "memory" forcing an end of all filters. |

As can be seen from the above table, LogExpress results are given a preferably secure random 64 bit signed long integer (i.e. 1 of approximately 18,446,744,073,551,616 values)—REQUEST_ID. Theoretically, it is possible to have a duplicate ID, however, the likelihood is minimal. Even if a duplicate is created, no serious problem would result since results are preferably stored by date. For the LogExpress request ID, a consecutive integer is preferably not used because this would allow the ID to be guessed, allowing data from other requests to be retrieved similar to security problems in early implementations of NFS and UNIX file descriptors. A consecutive integer is also not preferably used because it would require a centralized process to serve a unique ID. With a unique ID generated by the web server 140, results could be collected on the web server 140 requiring no central data structure. Using a centralized database could also have problems with the sequence number being reset, causing old requests to be displayed. A centralized database would also serialize operations that could cause a bottle neck.

A single master LogExpress service is elected within the cluster, which keeps a list of all running LogExpress filters. There is a companion processor LogExpress service on each cluster member. The master LogExpress service receives all requests for new LogExpress filters and contacts each processor LogExpress service to add the new filter. The master LogExpress service also receives requests to extend a LogExpress filter timeout and notifies each processor LogExpress service of the change. Typically, the master LogExpress filters will expire after a relatively short time interval. If there are two LogExpress filters with different timeouts, the longest timeout should be used.

A processor LogExpress service exists for each processor in the cluster, which keeps a backup list of the filters and relies on the master LogExpress service to modify the list. The list kept by the processor LogExpress service is used by the source to determine which filters to run. Preferably, list state modifications are controlled by the master LogExpress service and not the processor LogExpress service. There is typically no reconstruction needed on failure since the processor LogExpress service starts with an empty internal list of LogExpress filters and queries the master LogExpress service for the current list of filters.

Figure 9:
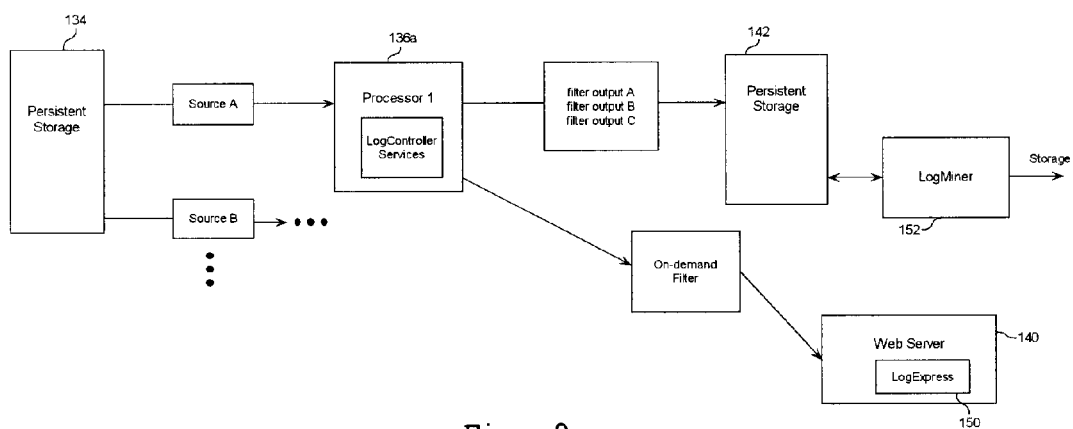
FIG. 9 is a block diagram showing data flow in a bulk processing operation.
Figure 10:
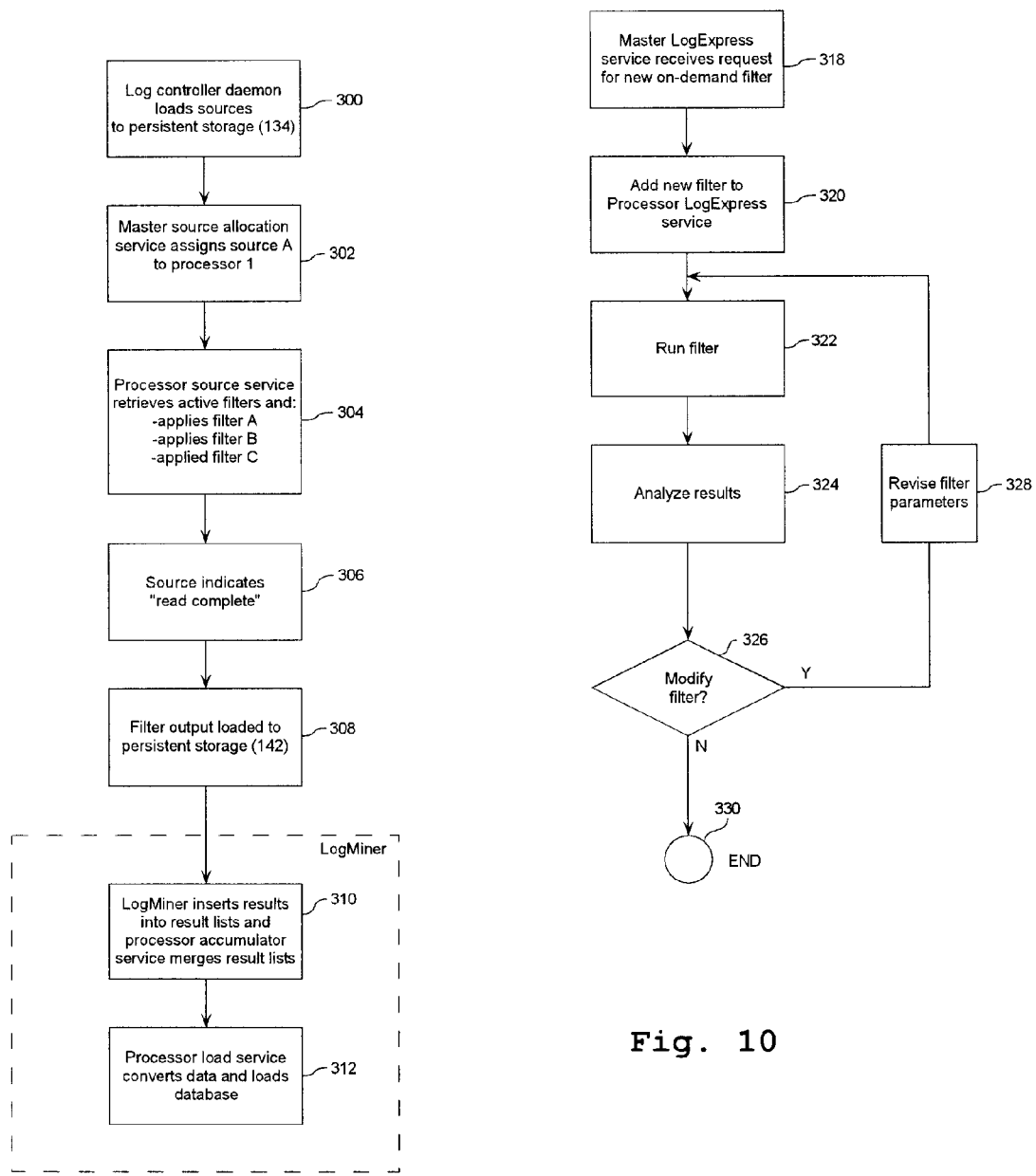
FIG. 10 is a flow chart showing the steps carried out in a single pass bulk filtering and on-demand filtering operation.

Referring now to FIGS. 9 and 10, an overview of the data flow in a bulk filtering operation is shown. In the example shown in FIG. 9, the processing of one arbitrary Source A is shown and it will be appreciated that other sources, e.g. Source B may be handled in a similar way. At step 300, the log processor daemon 132 loads a quantity of sources from the relay 124 to the input persistent storage 134. The master source allocation service for the cluster then assigns source A to processor 1 at step 302. The processor source service for processor 1 retrieves a list of active filters, and in this example determines that filters A, B and C are to be run for source A. The source then notifies the processor source service that the read has been completed and the processor source service in turn notifies the master source allocation service so that it can update the state for Source A.

As best seen in FIG. 9, three filter outputs are loaded to the persistent storage 142 at step 308. At step 310, the Log Miner 152 then processes the filter output by first inserting the filter result objects into result lists, which in this example comprises output A, B and C, and the processor accumulator service merges the result list for Source A with result lists of the other sources, e.g. Source B. The processor load service is then instantiated at step 312 which converts the data to a suitable database format and loads the database.

At the same time as the above operations, an on-demand filter can be performed by the LogExpress program 150 running from the web server 140. As best seen in FIG. 10, a request for a new filter generated at web server 140 is handled by the master LogExpress service at step 318. The master LogExpress service contacts the processor LogExpress service on processor 1 and adds the new filter to the locally maintained list at step 320. The processor LogExpress service then runs the filter at step 322 and the results are analyzed by a user, program etc. at the web server 140 in step 324. If at step 326 it is determined that the filter should be modified, the filter parameters are revised at step 328 and the filter is run again. If the filter is not to be modified, the process ends at step 330.

Since the above is also performed on processor 2, processor 3 and so on, the merge operation at step 310 can include the filter results from multiple machines at the same time and thus minimizing bottle necks. As the processing requirements increase in accordance with an increase in data flow through the relay 124, the processing throughput can be maintained by simply configuring more server machines 160 in the distributed system 135

Figure 11:
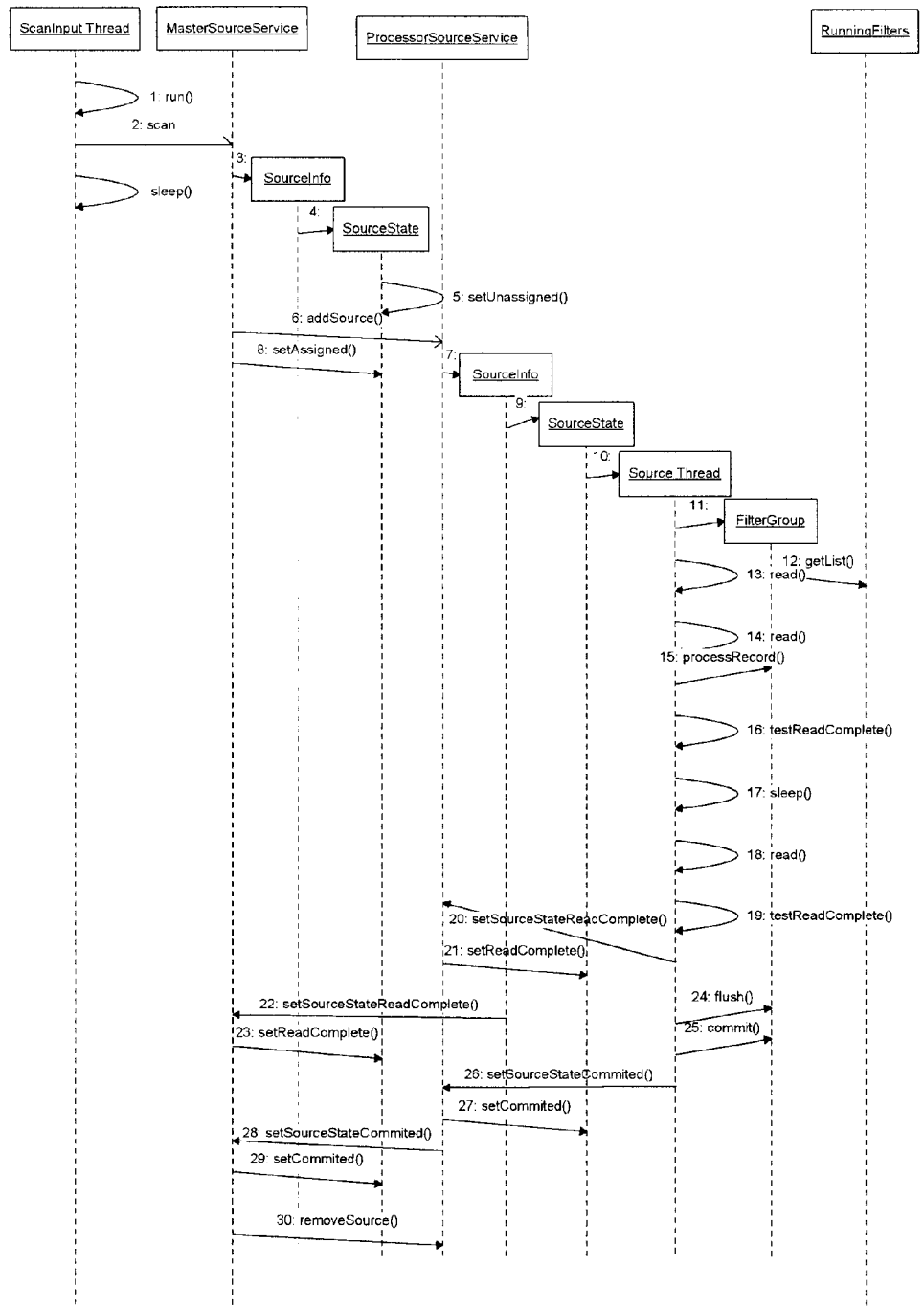
FIG. 11 is a flow diagram showing the life sequence of a source.

The life sequence for a source is exemplified in FIG. 11 illustrating the above described chances in state for a source. An input thread is executes at step 1 and a scan is performed at step 2 to identify sources that are available for processing. A source that is located in the scan during step 2 is then handled by the master source allocation service at step 3 and the input thread sleeps until the next scan. At step 3, the master source allocation service stores the source information and then creates a source state for that source at step 4 where initially the state is set to "unassigned" at step 5. The master source allocation service determines an available processor 136 and adds the source at step 6 by assigning the source to a particular processor source service at the processor, e.g. processor 1, where the processor stores the source information at step 7. At step 8, the master source allocation service updates the source state for that source by setting the state to "assigned".

The processor source service is now responsible for processing the source and creates its own record of the source state at step 9. Since the processor source service has received the source, it is implicit that the state is "assigned". A source thread instance is created at step 10 and the source thread registers with a filter group object at step 11, which creates a unified pattern to optimize scanning for data. The filter croup obtains a current filter list at step 12 from the running filters, which is accessible to the overall system. The filter croup reads the filters at steps 13 and 14 and during the read applies all active filters to the source. The source thread commands the filter group to process the record at step 15. The record is the "matching" data for a filter. A filter in this example registers for a pattern and when that pattern is found in the source, the source is sent to the filter. For efficiency, generally the filters do not process the data but rather specify to a source thread what it is they are looking for. The source thread then reads the source for all filters and contacts specific filters with a section of data that matches the pattern. The section of data may be referred to as the record. The filter then converts the raw section of data into an internally useful format so that it has a particular meaning to the system.

At step 16 the test read is completed and the source thread sleeps at step 17 and performs another read at step 18. In this example, Syslog records do not generally have a defined end, thus for source types that do define an end, the data is processed to completion whereas those that do not have an end (e.g. Syslog), a sleep( ) function allows the system to wait for a specified period of time to allow more data associated with the source to be appended. The second test read completes at step 19 and the source thread notifies the processor source service at step 20 that the test read has been completed. The processor source service sets its local source state to "read complete" at step 21 and then notifies the master source allocation service at step 22 that the read has been completed, and then in turn the master source service sets it master source state to "read complete" at step 23.

The source thread also flushes the results of the filter at step 24 and the results are committed to persistent storage 142 at step 25. Once the source filter results have been committed, the source thread notifies the processor source service that the results have been committed at step 26 and the processor source service then sets its local source state to "committed" at step 27. The processor source service then in turn notifies the master source service of the new state at step 28 and the master source service then updates the master source state to "committed" at step 29 and commands the processor source service to remove the source at step 30.

Figure 12:
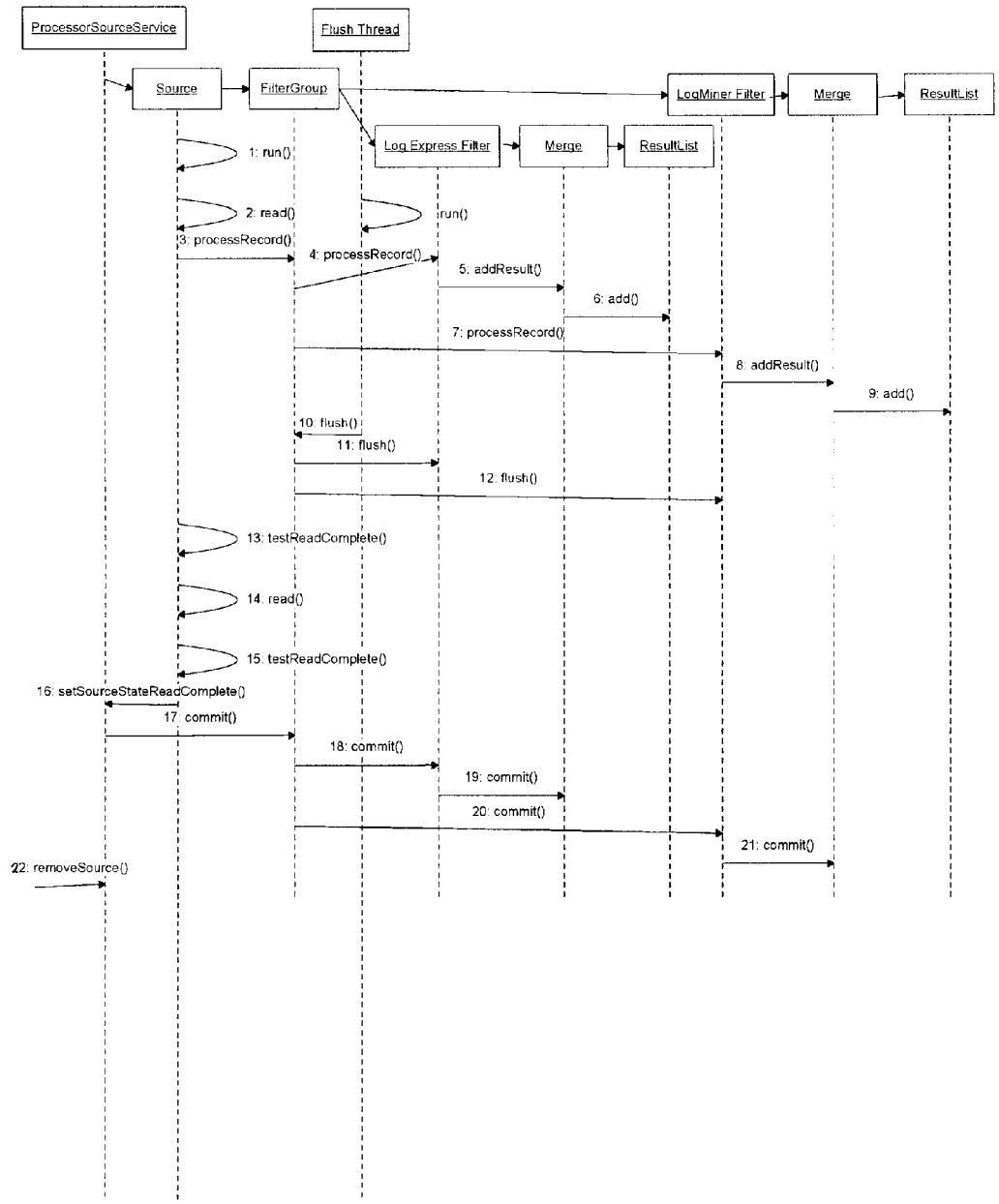
FIG. 12 is a flow diagram showing a filter to result output sequence.

The steps executed during a single pass, which includes a LogExpress filtering operation and the bulk Log Miner filtering operation, are shown in greater detail in FIG. 12. Steps 1, 2 and 3 correspond to steps 13, 14 and 15 in FIG. 11. At step 4, the filter croup commands the LogExpress filter to process the source and the result of this on-demand filter is added at step 5 to a merge object and the merge object adds the result to a LogExpress result list at step 6.

At step 7, the filter group commands the Log Miner filter for each processor 136 to process the source and after the bulk filtering, occurs, the results from all processors 136 are sent to an additional merge object at the merge and load processor 144 created by the master processor 141 at step 8 and the merge object adds the result to a Log Miner result list at step 9. A flush thread object created by each processor 136 commands the filter group to flush the source at step 10 and the filter group sends a flush command to the LogExpress and Log Miner applications at steps 11 and 12 respectively.

For source types that have no explicit end of data marker, at step 13 after the read is completed, another read is performed at step 14 to confirm the file has no new data being added. Since no further filtering is needed, the read is completed at step 15. At step 16, the source notifies the processor source service that the read has been completed and the processor source service then sends a command to the filter group to commit the results to persistent storage at step 17. The filter group sends a command to the LogExpress application at steps 18 and 19 to commit the results. The Log Miner 152 then commands the merge object to load the result list using the load service at steps 20 and 21 and then the source is removed by the processor source service at step 22.

Figure 13:
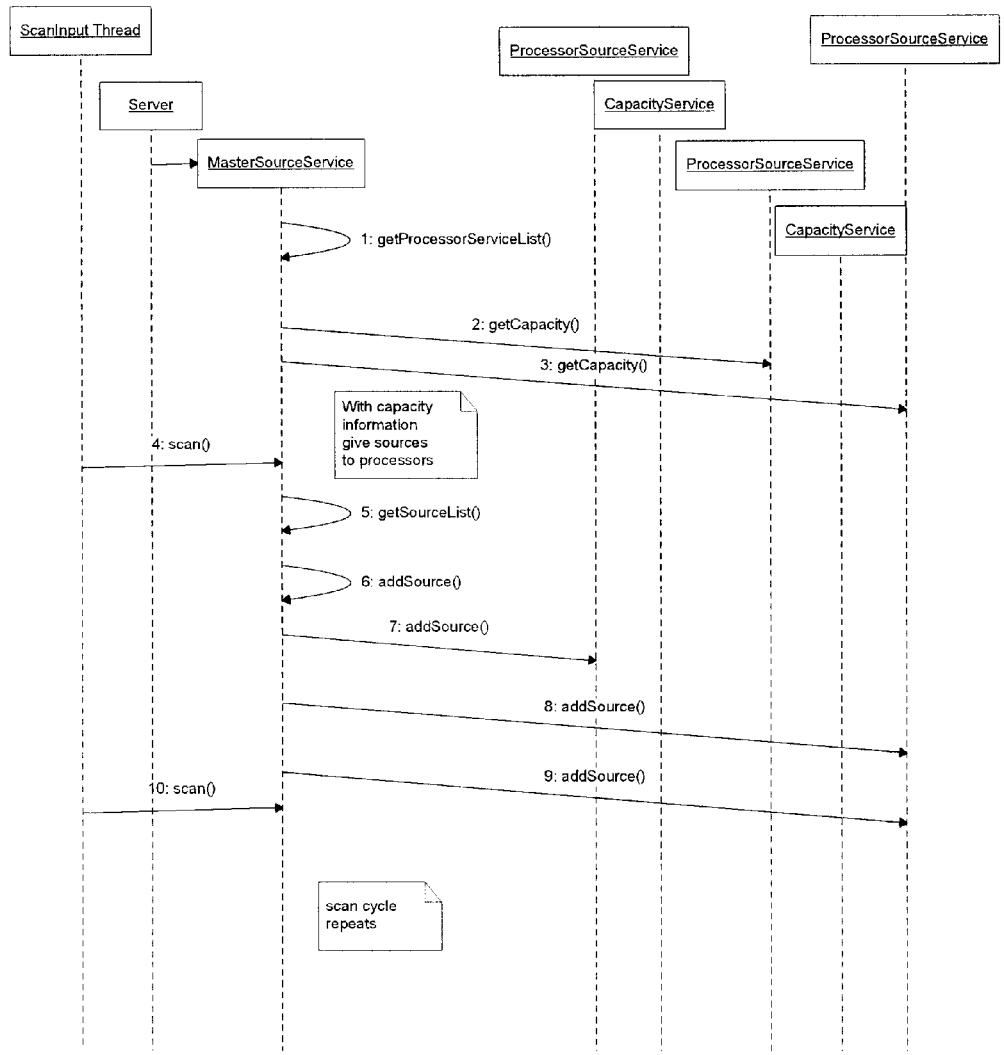
FIG. 13 is a flow diagram showing a master source allocation service sequence.

A sequence of steps performed under the authority of the master source allocation service is shown in FIG. 13. At step 1, the master source service obtains a processor service list indicating the availability of the three processor source services shown in the figure. At steps 2 and 3, the master source service initiates a getCapacity( ) function to estimate how many additional sources each processor 136 can handle for the purpose of plan allocation. The scan is enabled at step 4, the master source service obtains at list of available sources at step 5 and then runs an addsource( ) function at step 6 which uses the capacity information to allocate sources to processors. As shown in FIG. 13, an addSource( ) function provides the sources to the processors at steps 7-9 and another scan is initiated at step 10 which repeats the scan cycle.

Figure 17:
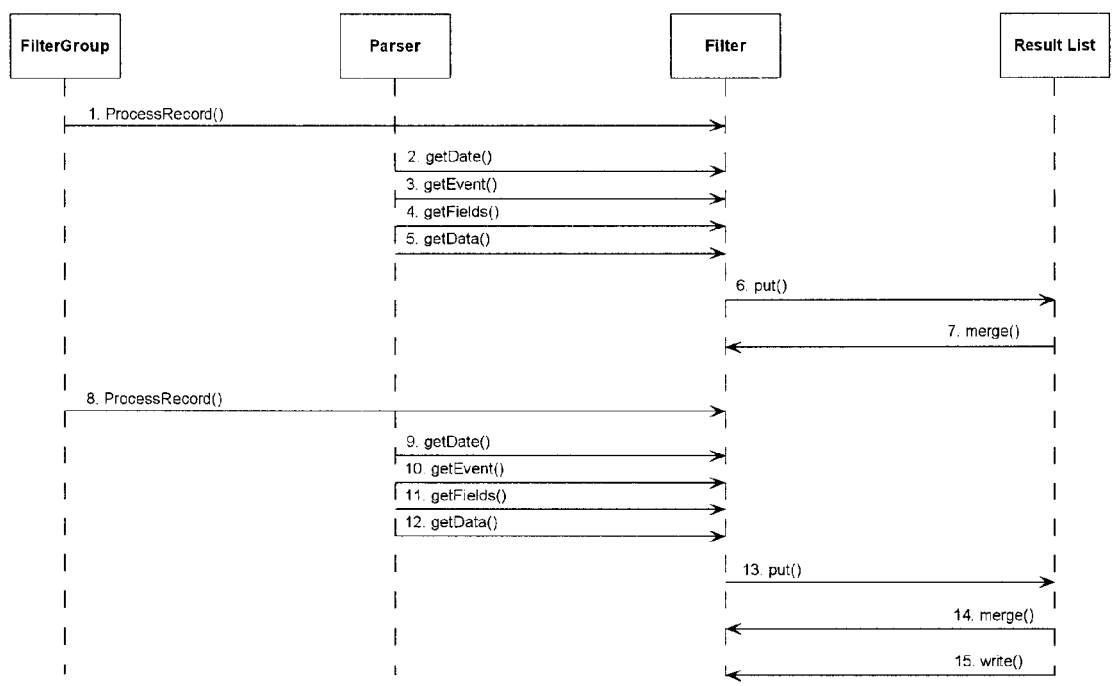
FIG. 17 is a flow diagram showing a filter sequence.

An example of a filter sequence executed by the Log Miner 152 is shown in FIG. 17. As noted above, each source is a piece of operational data. The FilterGroup object which is located within the source looks for pieces of data or "records" within the source that match specific patterns defined by the filters. The FilterGroup will look for all filters at the same time. As seen in FIG. 17, the first record is processed by a parser to put the data being filtered into a useable form. The results are put to a result list and an internal merge is performed to remove duplicates and, if necessary, add related results, e.g. results related to the receipt of the message at a later time (non continuous stream). The next record is then processed in a similar manner. Each record is processed and when no further records exist for the source, the result list is written to persistent storage 142.

Figure 16:
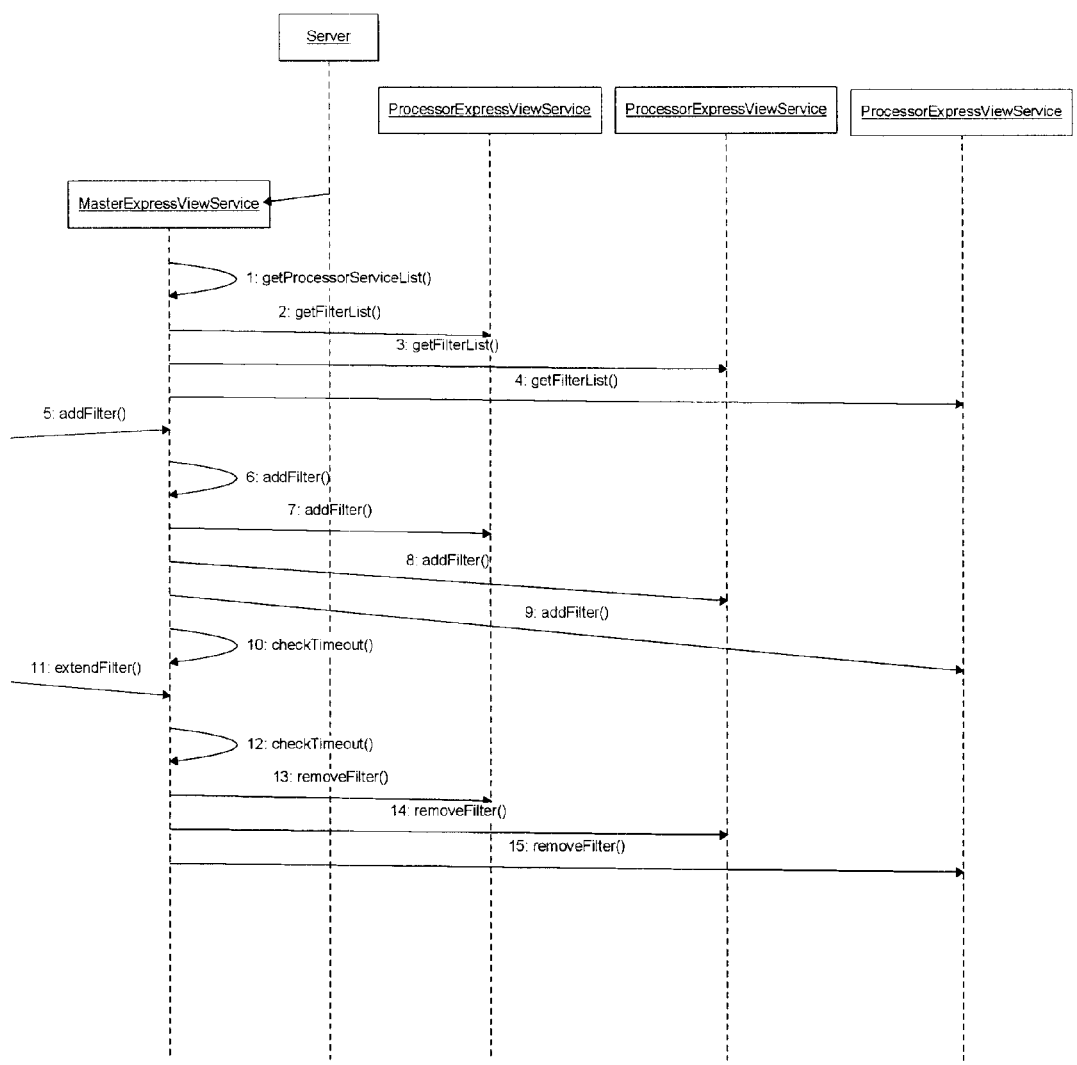
FIG. 16 is a flow diagram showing an on-demand filter query.

A master LogExpress service sequence is shown in FIG. 16. At step 1 the master LogExpress service obtains a list of processor services that are available for running LogExpress filters. At steps 2, 3 and 4, the three processor LogExpress services shown in the figure obtain the filter list, which initially is empty. At step 5 an on-demand LogExpress filter is added through the web server 140 and the master LogExpress service executes an add filter function at step 6. The filters are added to the processors at steps 7, 8 and 9 and the master LogExpress service then waits for a predetermined period of time and checks for a timeout at step 10. In this example, at step 11, a command is entered to extend the time for running the filter and the master LogExpress service continues to wait for the filter to run while checking for a timeout at step 12. When the filter has finished running it is removed from the processors at steps 13, 14 and 15.

Preferably, there is a capacity service in the system that monitors available resources to prevent a low memory situation. The master source allocation service would typically use a separate capacity server to avoid over committing a system. If the LogExpress system runs out of memory, all running LogExpress filters are terminated and the result lists are cleared (not flushed). A new entry is then added to the result list to indicate that the result list has been cleared. On memory allocation failure, LogMiner can commit to persistent storage any result list with sources that indicate a "read complete" state, in order to reclaim enough memory to continue normal processing. LogMiner terminates any data accumulation operations and informs the master data load accumulator service to reschedule.

If a log processor is lost, turned of, or crashes, the other functioning processors will take over and process the source. Losing a processor will degrade performance but does not cause a loss in data. A source remains as a candidate from filtering until all of the filter output files (results) have been committed. If all processors are lost, e.g. due to a power failure, when operations resume, processing will continue from the point of failure when the processors are restarted. The master source allocation service reschedules the sources for filtering.

Figure 14:
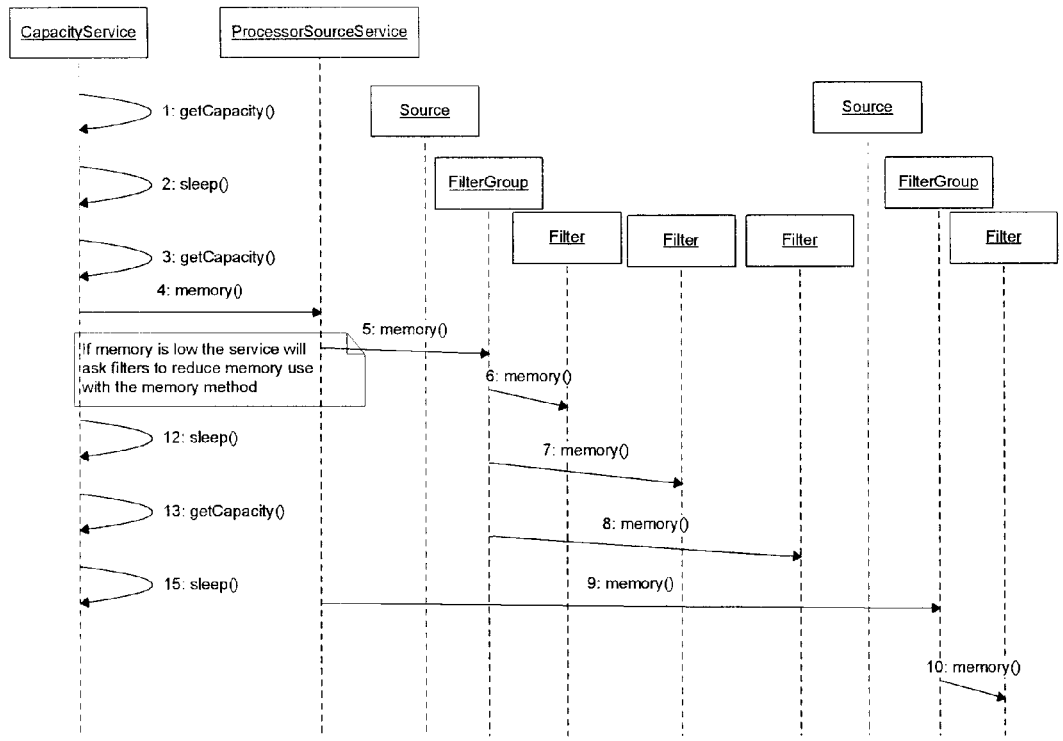
FIG. 14 is a flow diagram showing a low memory sequence.

A low memory sequence is shown in FIG. 14. The capacity service is used to estimate how many additional sources and processes can be handled so that the master processor 141 can plan the allocation of source processing. The capacity service monitors the available memory on the system by running a getcapacity( ) function (step 1), which tells the filters whether or not the memory is too low and if so, to free as much as possible.

Database connectivity may be lost due to events such as network problems, database problems or system maintenance. Result lists are thus retained until they can be successfully loaded into the database 146.

Figure 15:
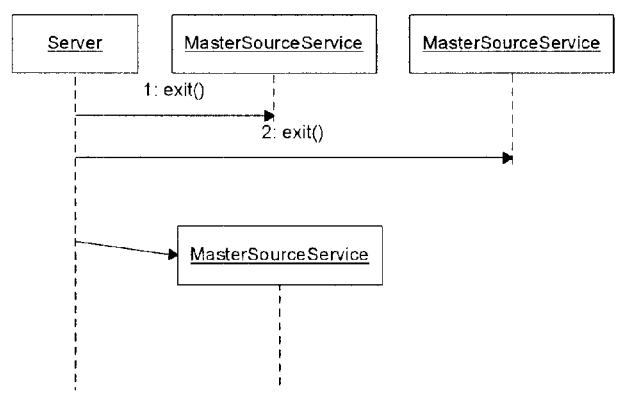
FIG. 15 is a flow diagram showing a split-brain sequence.

When the network is segmented, multiple clusters may become active. This may be referred to as a "split brain"

problem. When the separate clusters are reconnected, the service instances on each processor detect the duplicate master services and terminate them. By terminating the master services, a new master service will then be re-elected. As shown in FIG. 15, the duplicate master source services are terminated (exit) at steps 1 and 2 and then a new master source service is thereafter elected.

Therefore, a method and system are provided for processing large amounts of data or "sources" that are associated with messages and other transmissions being routed through a data communications system. A distributed system 135 is used to process the sources in parallel. The system includes the master processor 141 and at least one additional companion processor 136. The master processor 141 is responsible for obtaining the sources and routing the sources to the additional processors 136. The additional processors 136 filter the sources for information pertaining to the sources and the filter results are combined and stored in a database. An on-demand filter can be run in parallel from a web server which allows dynamic filtering of information that is of interest at a particular time and may be recursively modified. In one embodiment Jini technology and a Java environment are used to provide a flexible and robust system for dynamic clustering and reliable parallel processing of the large amounts of sources associated with messages passing through the relay 124.

Although the above has been described with reference to certain specific embodiments, various modifications thereof will be apparent to those skilled in the art as outlined in the appended claims.

What is claimed is:

1. A method for processing operational data associated with transmissions in a data communication system to obtain information pertaining to said transmissions, said method comprising:
    enabling access to a server in said data communication system, wherein all transmissions in said data communication system pass through said server;
    obtaining operational data associated with each of a plurality of transmissions as said transmissions pass through said server and forwarding that operational data to a master service in a distributed system comprising a plurality of processor services, wherein said master service has been assigned from one of said plurality of processor services based upon availability, wherein any available one of said plurality of processor services can be assigned as said master service, said master service for distributing said data amongst the others of said plurality of processor services for processing said data;
    said master service routing said data to respective ones of said others of said plurality of processor services according to availability of said others of said plurality of processor services;
    each of said respective ones of said others of said plurality of processor services processing, in parallel, respective data routed thereto in a predetermined manner until said processing has been completed, to obtain said information pertaining to said transmissions, and to generate one or more result lists containing said information;
    merging said one or more result lists with other corresponding result lists generated by the others of the respective ones of said others of said plurality of processor services to generate one or more merged result lists; and
    storing said one or more merged result lists for later analysis.

2. A method according to claim 1 wherein said processing comprises running one or more filters to obtain said information, said filters being chosen according to predetermined criteria.

3. A method according to claim 2 wherein said criteria comprise one or more of data type, content pattern, and time range.

4. A method according to claim 1 further comprises requesting an on-demand filter to obtain selected information, adding said on-demand filter to one or more of said others of said plurality of processor services, running said on-demand filter to obtain said selected information, and merging said selected information from all of said plurality of processor services running said on-demand filter for later analysis.

5. A method according to claim 4 further comprising revising said on-demand filter and recursively running said on-demand filter according to a revised set of selected information.

6. A method according to claim 1 further comprising removing said data once said one or more merged result lists have been stored.

7. A method according to claim 1, wherein upon failure of said master service, said method further comprises re-assigning a new master service chosen from said distributed system.

8. A method according to claim 1 wherein if a duplicate master service exists, said master service and said duplicate master service are de-allocated and a new master service is assigned.

9. A method according to claim 1 further comprising determining if a low memory state exists for any one of said others of said plurality of processor services and redistributing said data to balance memory resources.

10. A system for processing operational data associated with transmissions in a data communication system to obtain information pertaining to said transmissions, said system comprising:
    a distributed system connectable to a server in said data communication system, wherein all transmissions in said data communication system pass through said server, said distributed system capable of obtaining operational data associated with a plurality of transmissions as said transmissions pass through said server and forwarding that operational data to a master processor in said distributed system, said distributed system comprising a plurality of processors and being configured for assigning one of said plurality of processors as said master processor based upon availability, wherein any available one of said plurality of processors can be assigned as said master processor, said master processor being responsible for routing said data to respective ones of said others of said plurality of processors according to availability of said others of said plurality of additional processors, each of said respective ones of said others of said plurality of processors being configured for processing, in parallel, respective data routed thereto in a predetermined manner until said processing has been completed, to obtain said information pertaining to said transmissions, and for generating one or more result lists containing said information, the distributed system being configured for merging said one or more result lists with other corresponding result lists generated by the others of respective ones of said others of said plurality of processors to generate one or more merged result lists; and
    a data storage device configured for storing said one or more merged result lists for later analysis.

11. A system according to claim 10 further comprising a set of filters for obtaining said information, wherein each of said respective ones of said others of said plurality of processors is configured for choosing one or more of said filters according to predetermined criteria.

12. A system according to claim 10 further comprising a web server configured for requesting an on-demand filter to obtain selected information, said system being configured for adding said on-demand filter to one or more of said others of said plurality of processors, said one or more of said others of said plurality of processors being configured for running said on-demand filter to obtain said selected information, the web server also being configured for merging and storing said selected information from all of said plurality of processor services running said on-demand filter for later analysis.

13. A system according to claim 12 wherein said web server is capable of revising said on-demand filter and recursively requesting said on-demand filter according to a revised set of selected information.

14. A system according to claim 10 wherein said system is configured to remove said data from said system once said one or more merged result lists have been stored.

15. A system according to claim 10 wherein said distributed system is capable of reassigning a new master processor chosen from said others of said plurality of processors upon failure of said master processor.

16. A system according to claim 10 wherein said distributed system is capable of detecting a duplicate master processor, and initiating the de-allocation of said master processor and said duplicate master processor and the assignment of a new master processor if said duplicate master processor is found.

17. A system according to claim 10 wherein said master processor is capable of determining if a low memory state exists for any one of said others of said plurality of processors and redistributing said data to balance memory resources.

18. A system according to claim 10 wherein said distributed system is a cluster of server machines connected to each other in a network.

19. A system according to claim 18 wherein said cluster is configured to utilize Jini technology and said master processor and said others of said plurality of processors are configured to operate in a Java environment.

* * * * *